US00RE34166E

United States Patent [19]

Davis

[11] E Patent Number: Re. 34,166

[45] **Reissued Date of Patent:* Jan. 26, 1993**

[54] FUEL PROCESSOR APPARATUS FOR DIESEL ENGINE POWERED VEHICLES

[75] Inventor: Leland L. Davis, San Antonio, Tex.

[73] Assignee: Davco Manufacturing Corporation, Saline, Mich.

[ * ] Notice: The portion of the term of this patent subsequent to Jan. 18, 2000 has been disclaimed.

[21] Appl. No.: 594,415

[22] Filed: Oct. 9, 1990

Related U.S. Patent Documents

Reissue of:

[64] Patent No.: 4,421,090
Issued: Dec. 20, 1983
Appl. No.: 435,681
Filed: Oct. 21, 1982

U.S. Applications:

[63] Continuation of Ser. No. 188,875, Sep. 19, 1980, Pat. No. 4,368,716.

[51] Int. Cl.[5] ..... F02M 31/00; B01D 23/00

[52] U.S. Cl. ..... 123/557; 210/184; 210/186

[58] Field of Search ..... 123/557; 210/184, 186, 210/183, 182, 187, 185, 302-307, 312, 313, 532.1, 532.2, 533, 534; 165/51, 52

[56] References Cited

U.S. PATENT DOCUMENTS

| | | | |
|---|---|---|---|
| 991,212 | 5/1911 | Kincaid | 210/534 |
| 1,477,947 | 12/1923 | Ensign | 210/313 |
| 1,623,074 | 4/1927 | Tartrais | 123/557 |
| 1,630,287 | 5/1927 | Amdursky | 210/313 |
| 1,866,970 | 7/1932 | Garland | 210/184 |
| 2,070,189 | 2/1937 | Webster | 165/108 |
| 2,326,691 | 8/1943 | Schum | 210/306 |
| 2,457,828 | 1/1949 | Lloyd | 210/534 |
| 3,021,681 | 2/1962 | Perry | 123/557 |
| 3,083,833 | 4/1963 | Kasten | 210/184 |
| 3,209,816 | 10/1965 | McQuerry | 165/71 |
| 3,312,350 | 4/1967 | Kasten . | |
| 3,335,866 | 8/1967 | Venter et al. | 210/533 |
| 3,447,511 | 6/1969 | Beard | 123/557 |

(List continued on next page.)

FOREIGN PATENT DOCUMENTS

| | | | |
|---|---|---|---|
| 397566 | 7/1924 | Fed. Rep. of Germany . | |
| 513329 | 2/1955 | Italy . | |
| 0237768 | 8/1925 | United Kingdom | 210/187 |
| 0587798 | 5/1947 | United Kingdom | 210/534 |
| 2031992 | 4/1980 | United Kingdom . | |

OTHER PUBLICATIONS

Advertisement in Diesel Equipment Superintendent (Nov. 1977).

Advertisement in Diesel Equipment Superintendent (Dec. 1977).

(List continued on next page.)

*Primary Examiner*—David A. Okonsky
*Assistant Examiner*—M. Macy
*Attorney, Agent, or Firm*—Basile and Hanlon

[57] ABSTRACT

A new fuel processor apparatus for diesel engines, particularly diesel engine powered vehicles, with the apparatus having no moving parts and no internal gaskets or connections to leak or deteriorate, and said apparatus being capable of removing water from the diesel fuel while promoting filterability and combustion efficiency of the fuel.

* * * * *

The questions raised in reexamination request No. 90/001,642, filed Nov. 22, 1988, have been considered and the results thereof are reflected in this reissue patent which constitutes the reexamination certificate required by 35 U.S.C. 307 as provided in 37 CFR 1.570(e).

4 Claims, 2 Drawing Sheets

U.S. PATENT DOCUMENTS

| | | | |
|---|---|---|---|
| 3,568,835 | 3/1971 | Hansen . | |
| 3,832,985 | 9/1974 | Edde | 123/548 |
| 3,913,543 | 10/1975 | Richard | 123/557 |
| 3,951,124 | 5/1976 | Fairbanks et al. | 123/557 |
| 3,986,486 | 10/1976 | Rabbiosi | 123/557 |
| 3,989,019 | 11/1976 | Brandt et al. | 123/557 |
| 4,091,265 | 5/1978 | Richards et al. | 123/557 |
| 4,091,782 | 5/1978 | Dunnam | 123/557 |
| 4,103,658 | 8/1978 | Bernecker | 123/524 |
| 4,146,002 | 3/1979 | Quinn | 123/557 |
| 4,213,432 | 7/1980 | Levy | 123/557 |
| 4,218,999 | 8/1980 | Shearer | 123/557 |
| 4,318,384 | 3/1982 | Moffett | 123/549 |
| 4,321,136 | 3/1982 | Matsui . | |
| 4,359,433 | 11/1982 | Hartel | 123/549 |
| 4,368,716 | 1/1983 | Davis | 123/557 |
| 4,428,351 | 1/1984 | Davis | 210/184 |
| 4,579,653 | 4/1986 | Davis | 210/86 |

OTHER PUBLICATIONS

"Zero Start Cold Weather Starting Aids", The Budd Company (1978).

Walbro Fuel-Pro Product Description (Jun., 1979).

"Fuel Heater/Water Separator is Simple But Effective", Fleet Owner (Jan., 1980).

FUEL PROCESSOR APPARATUS FOR DIESEL ENGINE POWERED VEHICLES

Matter enclosed in heavy brackets [ ] appears in the original patent but forms no part of this reissue specification; matter printed in italics indicates the additions made by reissue.

This is a *reissue of application Ser. No. 435,681 filed Oct. 21, 1982 now U.S. Pat. No. 4,421,090. Application Ser. No. 435,681 is a* continuation of application Ser. No. 188,875, filed Sep. 19, 1980 now U.S. Pat. No. 4,368,716.

BACKGROUND OF THE INVENTION

This invention broadly relates to a new fuel processing apparatus for diesel engine powered trucks and automotive vehicles, as well as other diesel engine power installations.

The state of the art is indicated by the following cited references (U.S. Pat. Nos.): Dunnam 4,091,782; Quinn 4,146,002; Gratzmuller 3,354,872; McMinn 3,396,512; McCabe 3,762,548; Campbell 3,768,730; Richard 3,913,543; Cheysson 3,925,204; Virgil 3,935,901; McQuerry 3,209,816; Rehm 3,962,999; Zabenski 4,015,567; Amano 4,027,639; Linder 4,044,742; Hawkins 4,072,138; and Richards 4,091,265.

In the past when diesel fuel was plentiful and relatively inexpensive there were significantly fewer problems with the quality of the diesel fuel because of the substantial competition between sellers of the fuel. Refineries, distributors, and retailers of the fuel were careful to keep water out of the fuel, and they usually did not pump out the heavy settlings from the bottom of the fuel storage tanks. In more recent times, with shortages of oil, the fuel suppliers can sell essentially all of their available oil with little difficulty. Additionally, fuel suppliers in the past have blended kerosene and other fuels with lower cloud and pour points to Diesel Fuel to facilitate cold weather flow and use. Fuel allocations due to government regulations and oil shortages have now made it almost impossible to continue this practice. The result has been a distinct tendency toward lesser quality fuel containing substantially more impurities such as water and particulate materials which are very disruptive to proper operation of a diesel engine.

*No. 2 diesel fuel has a cloud point temperature (temperature at which wax crystals form) of 0° to 20° F. and a pour point temperature (freeze temperature) of from 7° to 10° F. below the cloud point temperature. The fuel delivery systems of diesel engines used in automotive applications are designed for optimum operation when the fuel is delivered to the injectors at temperatures within the range of about 40° F. to about 90° F., a temperature range encompassing normal ambient outdoor temperatures encountered in automotive vehicle operation throughout most of the year throughout most of the United States. Fuel temperatures above and below this range can adversely affect engine operation.*

*It has long been recognized that winter operation of diesel engines in cold climates will be greatly improved by heating of the diesel fuel to deliver the fuel within the design temperature range to the injectors and it is also well known that such heating will prevent the formation of wax crystals in the fuel and enhance the separation of water from the diesel fuel if the water is given a chance to settle out to a point in the system from which it may be periodically drained. However, the prior art has been primarily concerned with heating the diesel fuel during cold weather operation and has largely ignored the fact that addition of heat to the fuel is not really necessary at ambient temperatures above 40° F. and is undesirable at ambient temperatures above 90°. Various forms of thermostatically controlled electric heaters have been proposed—see, for example, Richards et al 4,091,265. However although these provide accurate temperature control of the electric heater they have not been found practical for automotive diesel applications because their electric power requirements for cold weather operation, when added to the requirement of other electrically operated units of the vehicle, can easily exceed the cold weather capacity of the vehicle's electrical power supply system.*

Accordingly, a main object of this invention is to provide a new and improved fuel processor apparatus for diesel trucks and other diesel powered automotive vehicles to remove water from the diesel fuel, while at the same time providing for increased fuel economy.

Another object of the invention is to provide a new fuel processor apparatus which includes a unique built-in but removable fuel filter element (e.g., of either the spin-on or drop-in type).

Another object of the invention is to provide a new fuel processor apparatus which heats the fuel to promote filterability, combustion efficiency, water removal, and to reduce crystallization of fuel wax elements.

Another object of the invention is to provide a new fuel processor apparatus which removes water from the fuel to protect the fuel pump and fuel injection components and protects fuel filter elements to extend the filter operation life.

Another object of the invention is to provide a new fuel processor apparatus which when installed in the heater water line circuit, permits automatic operator control of heat to the fuel processor apparatus, in that the operator controls the passenger compartment heat and the fuel processor heat simultaneously.

Another objective of the invention is to be able to utilize the heat energy or crankcase or lubricating oil from the engine—either air or water cooled—to heat the diesel fuel to obtain the benefits of this invention.

Other objects, features and advantages of the present invention will become apparent from the subsequent description and the appended claims taken in conjunction with the accompanying drawings.

DESCRIPTION OF PREFERRED EMBODIMENTS

Figure 1:
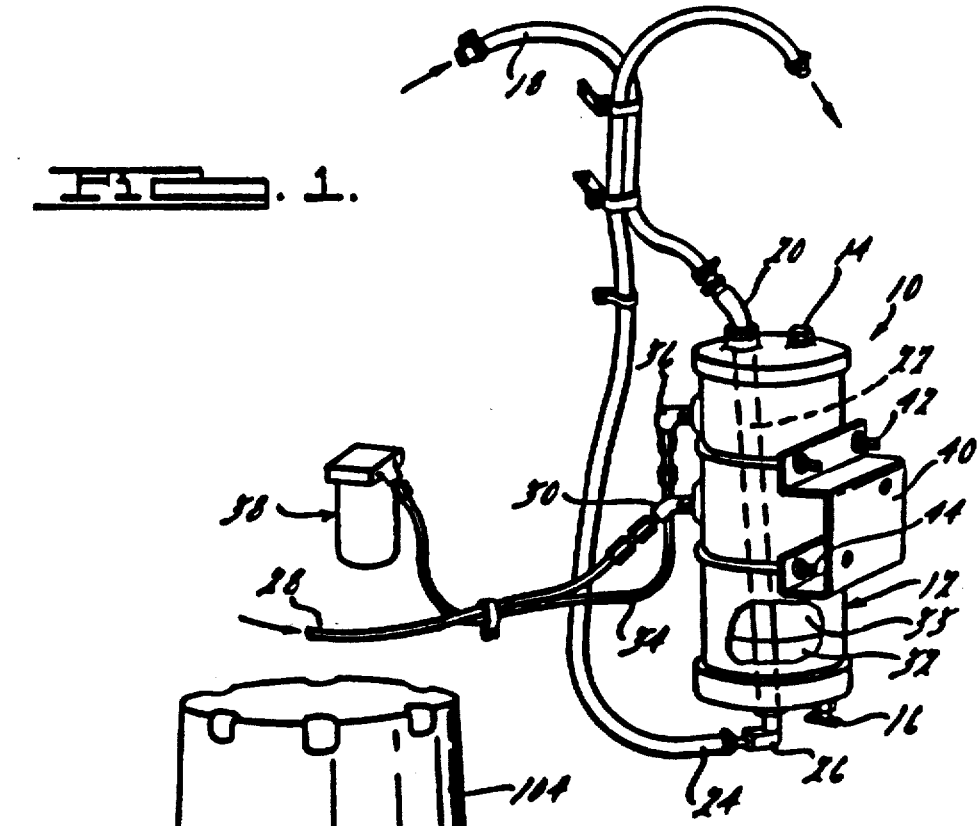
FIG. 1 of the drawings illustrates a typical installation of the fuel processor apparatus of this invention.

FIG. 1 illustrates a typical installation of the fuel processor apparatus generally designated 10 in accordance with the invention. The apparatus 10 is preferably constructed in the form of a seamless extruded aluminum vessel 12 which has a vent or filler plug 14 at the top and a drain fitting 16 at the bottom of the vessel. Hot coolant liquid (e.g., from the heater return water line circuit or oil from engine) is introduced to the vessel 12 through an inlet line 18, *connected to the return line of the passenger compartment heater*. The heated coolant liquid is introduced to the interior of the vessel 12 via the inlet fitting 20 and flows through the central portion of the vessel in straight-through fashion by means of flow-through conduit 22, from which it passes to the outlet conduit 24 which is connected to the vessel 12 by means of the fitting 26. The hot coolant liquid leaves the vessel 12, passes through the conduit 24 and is returned via a heater line to the water pump (not shown) of the vehicle. The construction of the fuel processor apparatus 12 and and interior conduit 22 is preferably of aluminum because of its excellent heat transfer quality and compatibility with the vehicle cooling system. However, other construction materials can of course be used.

*By employing the drivers compartment heater return line as the heat source for the processor, the amount of heat added to the fuel by the processor is adjusted in accordance with the outside ambient temperature in that the driver will be operating the compartment heater at its maximum heat output in extreme cold weather conditions and normally will not run the heater when the outside temperature is above 65°-70° F.*

Cold wet diesel fuel from the fuel tank of the truck or vehicle is introduced to the apparatus 10 via the fuel inlet line 28 and the fitting 30 from which it passes into the interior of the vessel 12. The diesel fuel once passing through the internal portion of the vessel 12 is heated by counter-action and contact with the hot coolant liquid passing through the conduit 22. Due to the heat exchange action which takes place within the vessel 12 and also due to the significant difference between the specific heat of fuel oil and the specific heat of water contained therein, the suspended water (as well as any ice crystals suspended in the fuel) are separated out of the fuel and settle to the bottom of vessel 12 in the form of collected water 32 beneath the diesel fuel 33.

The water-free heated fuel then passes out the outlet condut 34 via the fitting 36, and then the water-free heated fuel is introduced to a primary fuel filter 38 from which it is transmitted to the diesel engine.

A bracket 40 and U-bolt clamping means 42, 44, can be used to suitably mount the fuel processor apparatus at any sturdy convenient location on the vehicle.

There now follows a description of the embodiment of the invention shown in FIGS. 2-5, wherein the fuel processor apparatus includes a built-in integral fuel filter. In the embodiment of FIGS. 2-5 the fuel processor apparatus 100 is constructed in the form of a generally elongated cylindrical vessel 102 which has an integral filter member 104 at the top thereof and a drain plug 106 at the bottom thereof. Hot coolant liquid (e.g., from the heater return water line circuit) is introduced to the vessel 102 through an inlet line 108 from which it assumes the flow path through the vessel 102 to pass through the interior of the vessel by means of flow through conduit 109, and subsequently it passes to the water outlet conduit 110.

Cold or unprocessed diesel fuel from the fuel of the truck or vehicle is introduced to the apparatus 100 via the fuel inlet line 112 from which it passes into the interior of the vessel 102 by means of the conduit 113. The diesel fuel once passing through the internal portion of the vessel 102 is heated by counter-action and contact with the hot coolant liquid passing through the conduit 109. Due to the heat exchange action which takes place within the vessel 102 and also due to the significant difference between the specific heat of the fuel oil and the specific heat of the water contained therein, the suspended water, (as well as any ice crystals suspended in the fuel) are separated out of the fuel and settle to the bottom of the vessel 102 in a fashion similar to the operation of the FIG. 1 embodiment. The water-free heated fuel then passeas out of the vessel 102 by means of the conduit or passage way 115 which introduces the fuel to the filter element 104, which includes a filtering material designated 117. The filtration material 117 operates to remove particulate material which resides in the diesel fuel.

The filter element 104 is a spin-on type of filter (or it could be a drop-in type filter) which is integrally connected to the apparatus 100 by means of a threaded connection 119. After the fuel has passed through the filtration material 117 the fuel exits from the filter via the conduit 121 and the fuel outlet conduit 123.

Figure 2:
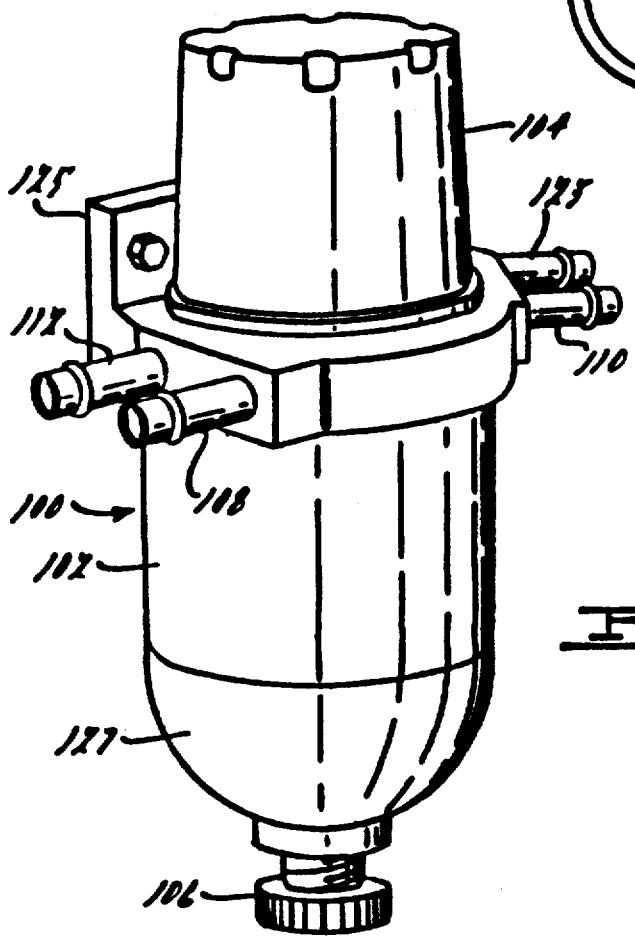
FIG. 2 illustrates the embodiment of the invention with a built-in fuel filter. (Two types—Integral or spin-on)
Figure 3:
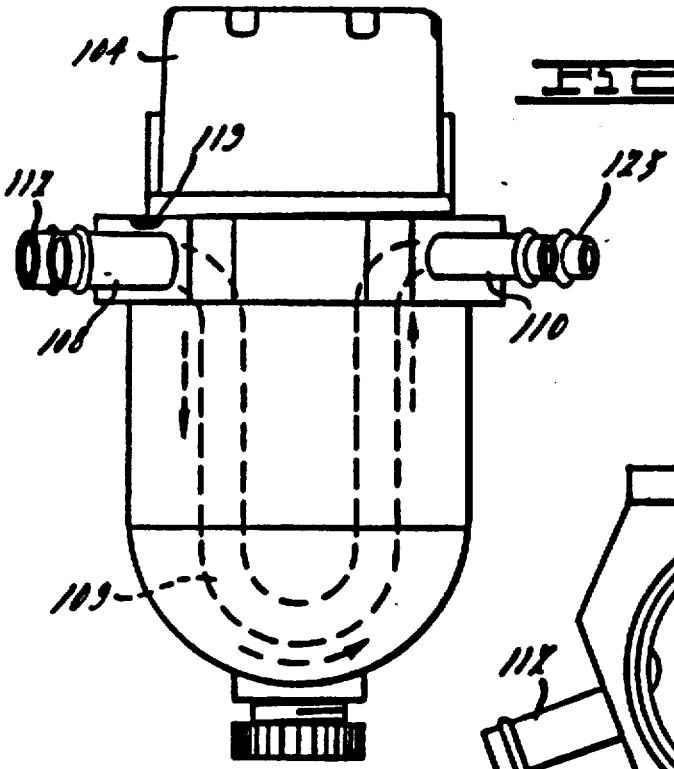
FIG. 3 illustrates a front elevation view of the embodiment of FIG. 2.
Figure 4:
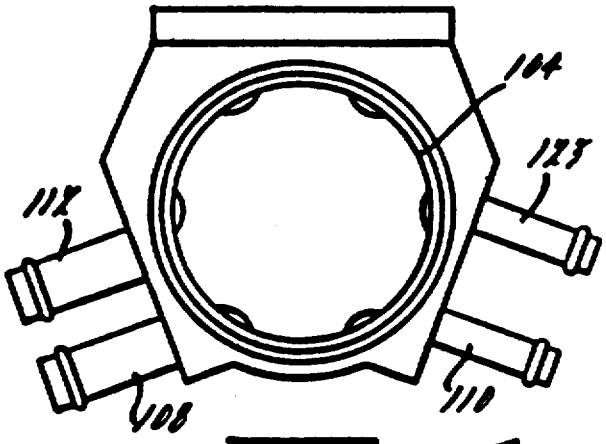
FIG. 4 illustrates a cross-sectional view taken along the line 4—4 of FIG. 3.
Figure 5:
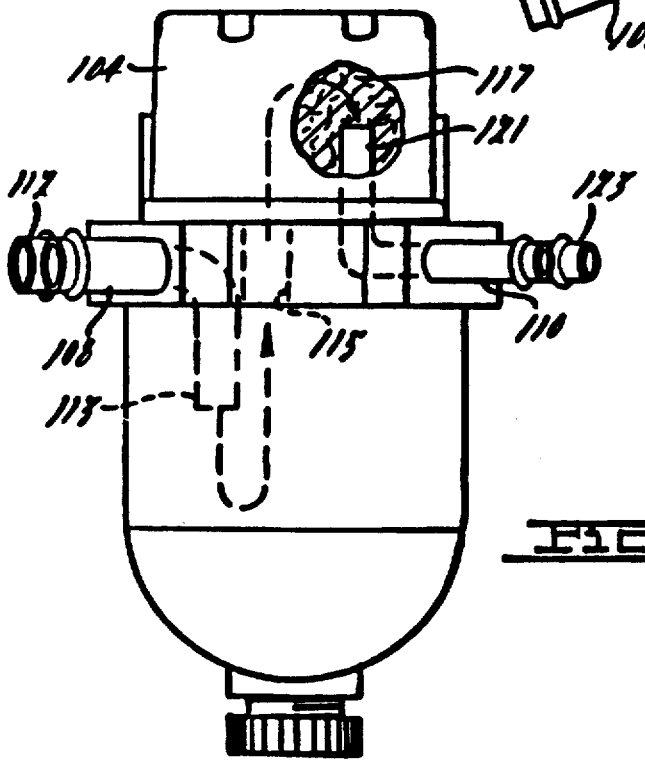
FIG. 5 is a general schematic view illustrating the flow path for the diesel fuel in the embodiment of FIGS. 2–4.

Additional features which are present in the embodiment designated 100, and particularly as shown in FIG. 2 are that the bottom of the vessel 102 may suitably include a transparent or see-through section designated 127 so that the collected water can be observed at the bottom of the vessel 102, thus facilitating removal of the water at periodic intervals. In addition, the lower length of the vessel 102 can be extended to make the overall fuel processor apparatus 100 of variable capacity depending upon the fuel requirements of the engine. A bracket means 125 can be used to suitably mount the fuel processor apparatus 100 at any sturdy convenient location on the vehicle.

*As shown in the drawings, both embodiments disclosed have the fuel inlet (30 FIG. 1; 112, 113 see FIG. 5) located to introduce fuel into the apparatus approximately at the midpoint of the height of the vessel, a location relatively remote from the bottom region of the vessel, where separated water collects, and from the fuel outlet (36 or 115) located near the top of the vessel. This midpoint fuel entry avoids remixing incoming fuel with previously separated water while providing sufficient residence time to enable water to settle out before the fuel passes into the outlet.*

*Both embodiments likewise find the internal heating liquid conduit (22, 109) extending through the chamber from its top to bottom (conduit 22, FIG. 1) or at least into the bottom region (conduit 109, FIG. 3) where settled out water collects. In extreme cold weather conditions, the amount of heat supplied to the fuel by the heating liquid may be sufficient to melt or prevent the formation of individual ice crystals in the fuel, but insufficient to melt a body of ice which might be created by freezing of settled out water collected at the bottom of the vessel where it contacts the vessel housing which is essentially at outside ambient temperature. By routing the heating conduit through the bottom region of the vessel where the separated water is collected freezing of this collected water is prevented. By locating the filter (FIGS. 2-5) at the top of the unit, rising heat from the lower portions of the unit assists the heating fuel in keeping the filter from freezing up.*

The fuel processor apparatus of the invention functions in a manner related more closely to a chemical or petro-chemical device rather than a mechanical device. Certain highly advantageous considerations in accordance with the invention are as follows:

(1) The specific heat of fuel oil is approximately one third that of water. (2) The specific gravity of fuel oil is approximately 80% of the specific gravity of water. (3) The coefficient of expansion differential between diesel fuel and water is so significantly different that when the fuel is heated, the twin phenomena of specific heat and coefficient of expansion causes water entrapped or suspended in the fuel to quickly separate and fall out—where it can be collected and drained away. (4) The surface tension of free water—once it is separated in the device of the invention—prevents water in the fuel processor from becoming resuspended in the fuel. (5) Bacterial growth occurs in fuels but essentially only when water is present. Bacteria are a major threat to fuel filters due to their clogging action. Bacteria have demonstrated their ability to "wick" themselves up around fuel filters to permit their propagation on filter elements—thus rapidly clogging filters and causing engines and vehicle downtime and repair costs. Water in the fuel can also result in the formation of sulfuric acid which is harmful to engine accessories and operation. The device of the present invention through its action of removing water from the fuel acts to alleviate the problems of bacteria formation and sulfuric acid formation. (6) The fuel processor device of this invention effectively dewaters fuel, removing over 99.7% of all suspended water—including that formed through the deterioration of the hydrocarbon molecule, and oxidation by the free oxygen in the atmosphere. (7) Ice crystals form in fuel during cold weather [+32° or lower] when molecules of water are present in fuels. The specific gravity of ice is very near that of fuel and permits ice to flow with the fuel to the filters. When this occurs, ice crystals can completely clog or seriously reduce fuel flow to the engine. The specific heat value for ice is 0.505 [or approximately ½ that of water]; ice crystals melt quickly in the fuel processor apparatus of this invention. The newly formed liquid water, being much colder than the fuel and consequently much heavier, immediately falls to the bottom of the fuel processor where it can be drained away. (8) Prevention of paraffin formations when ambient temperatures may drop below the cloud point of the fuel is accomplished by the fuel processor of the invention. In particular the greater weight of the molecules of paraffins and naphthenes are maintained in their liquid state. By enabling these heavy fuel elements to be used during cold weather, fuel economy is realized and the costs of adding chemicals or lighter grade fuels to dissolve the paraffin is eliminated. (9) Fuel oil, especially diesel fuel, shrinks when cooled. Fuel injectors operate by displacing a specific volume, therefore the heat potential of diesel fuel on a volume basis changes according to temperature. The fuel processor of this invention aids in improving fuel economy in diesel powered equipment in cold weather by restoring the diesel fuel molecule to a temperature consistent with factory engine calibrations and settings.

While it will be apparent that the preferred embodiments of the invention disclosed are well calculated to fulfill the objects above stated, it will be apparent that the invention will be susceptible to modification, variation and change without departing from the proper scope or fair meaning of the subjoined claims.

What is claimed is:

1. A fuel processor means for use with diesel engines on diesel trucks, automobiles, and the like, and whereby said fuel processor means is operative to [preheat] *heat* the diesel fuel and to separate out water-impurities from the diesel fuel, *and for melting wax crystals which form in cold ambient conditions before the fuel is transmitted to a particulate filter and enabling the diesel fuel to be used in cold ambient conditions without the use of fuel additives such as chemicals or lighter grade fuels to improve fuel flowability,* comprising:

a vertically oriented tubular vessel means *which provides for a substantially unconstrained flow path of the diesel fuel therethrough* operative for separating *the* water out of the fuel, *and collecting the water-impurities at the bottom of said vessel means,*

*first* inlet conduit means [to introduce] *for introducing* hot liquid from the engine *to said vessel means,*

[another] *a heat exchange* conduit means passing *from said first inlet conduit means* through a central portion of said vessel *means and into said bottom of said vessel means* for transmitting the hot liquid therethrough,

*first* outlet conduit means for recirculating the hot liquid *from said heat exchange conduit means* back through the engine system, a second inlet conduit means for introducing *unprocessed* fuel [to] *into* the interior of [the] *said* vessel *means* near the *vertical* midpoint thereof for flow therethrough [and such that this inlet is above the level of water-impurities being collected in the vessel,] *whereby said separation of the water-impurities provided by said fuel processor means begins to occur after the fuel enters from said second inlet conduit means into said vessel means,* a second outlet conduit means for the fuel near the top of [the] *said* vessel *means* for transmitting the water-free fuel to *the particulate filter and* the engine *whereby said second inlet conduit means and said outlet conduit means cause the fuel to flow through said vessel means in a manner which facilitates the separation of the water-impurities and minimizes remixing of the water-impurities being collected,* drain means at [the] *said* bottom of [the] *said* vessel *means* for draining out *the* water-impurities which collect therein *to prevent water impurities collected in the bottom of said vessel means from rising to the level of said second inlet conduit means,* and vent means near the top of [the] *said* vessel *means* for venting [the] *said* vessel *means* when desired.

2. A fuel processor means for use with diesel engines on diesel trucks, automobiles, and the like, and whereby said fuel processor means is operative to [preheat] *heat* the diesel fuel and to separate out water-impurities from the diesel fuel *and for melting wax crystals which form in cold ambient conditions before the fuel is transmitted to a particulate filter and enabling the diesel fuel to be used in cold ambient conditions without the use of fuel additives such as chemicals or lighter grade fuels to improve fuel flowability,* comprising:

a vertically oriented tubular vessel means *which provides for a substantially unconstrained flow path of the diesel fuel therethrough* operative for separating *the* water out of the fuel *and collecting the water-impurities at the bottom of said vessel means,*

*first* inlet conduit means to introduce hot liquid from the engine *into said vessel means,*

[another] *heat exchange* conduit means passing *from said first inlet conduit means* through a central portion of said vessel *means and into said bottom of said vessel* for transmitting the hot liquid therethrough,

*first* outlet conduit means for recirculating the hot liquid *from said heat exchange conduit means* back through the engine system, a second inlet conduit means for introducing *unprocessed* fuel [to] *into* the interior of [the] *said* vessel *means* near the *vertical* midpoint thereof for flow therethrough [and such that this inlet is above the level of water-impurities being collected in the vessel] *whereby said separation of the water-impurities provided by said fuel processor means begins to occur after the fuel enters from said second inlet conduit means into said vessel means,* a second outlet conduit means for the fuel near the top of [the] *said* vessel *means* for transmitting the water-free fuel to *the particulate filter and* the engine *whereby said second inlet conduit means and said second outlet conduit means cause the fuel to flow through said vessel means in a manner which facilitates the separation of the water-impurities and minimizes remixing of the water-impurities being collected*, and drain means at [the] *said* bottom of [the] *said* vessel *means* for draining out *the* water-impurities which collect therein *to prevent water impurities collected in the bottom of said vessel means from rising to the level of said second inlet conduit means.*

*3. A diesel fuel processor for separating water-impurities from diesel fuel and for preventing the formation of wax crystals in said fuel as said fuel is supplied to the diesel engine of an automotive vehicle, said vehicle having a drivers compartment heater through which coolant liquid heated incident to the operation of said engine is passed under the control of the driver to regulate the temperature in the drivers compartment,*

*said processor comprising a vertically elongated hollow tubular vessel having an internal processing chamber adapted to contain diesel fuel,*

*fuel inlet means for introducing unprocessed diesel fuel into said chamber at a location substantially midway between the top and bottom of the chamber,*

*fuel outlet means adjacent the top of said chamber for conducting processed fuel from said chamber to said engine,*

*liquid inlet means adjacent the top of said chamber for receiving coolant liquid passed through said compartment heater,*

*liquid outlet means for returning said coolant liquid to said engine,*

*a coolant liquid heat exchange conduit sealingly connected at its opposite ends to said liquid inlet means and to said liquid outlet means and extending from said liquid inlet means through the central and bottom of said chamber to said liquid outlet means to transfer heat from liquid passing through said heat exchange conduit to diesel fuel and water-impurities in said chamber,*

*and drain means at the bottom of said vessel for draining separated water-impurities collected in the bottom of said chamber from said chamber as required to maintain the level of said separated water-impurities a substantial distance below the location at which said unprocessed fuel is introduced into said chamber by said fuel inlet means.*

*4. A diesel fuel processor as defined in claim 3 wherein said diesel engine is a liquid cooled engine and said liquid heated incident to the operation of said engine is liquid coolant circulated through the engine cooling system of said engine.*

* * * * *